(12) United States Patent
Hancock, Sr. et al.

(10) Patent No.: US 8,075,036 B2
(45) Date of Patent: Dec. 13, 2011

(54) UTILITY VEHICLE WITH INTEGRATED PULL-OUT FRAMEWORK

(76) Inventors: Leonard H. Hancock, Sr., Hummelstown, PA (US); Leonard Hancock, Jr., Morgantown, WV (US)

( * ) Notice: Subject to any disclaimer, the term of this patent is extended or adjusted under 35 U.S.C. 154(b) by 12 days.

(21) Appl. No.: 12/493,344

(22) Filed: Jun. 29, 2009

(65) Prior Publication Data

US 2010/0078965 A1    Apr. 1, 2010

Related U.S. Application Data

(60) Provisional application No. 61/076,774, filed on Jun. 30, 2008.

(51) Int. Cl.
*B60P 3/00* (2006.01)

(52) U.S. Cl. .................... 296/26.09; 296/26.08

(58) Field of Classification Search ............... 296/26.08, 296/26.09, 165, 170–173, 175, 176, 26.12, 296/26.13, 19, 24.38; 52/67
See application file for complete search history.

(56) References Cited

U.S. PATENT DOCUMENTS

| | | | | |
|---|---|---|---|---|
| 2,784,027 | A * | 3/1957 | Temp | 296/26.09 |
| 4,830,242 | A * | 5/1989 | Painter | 296/26.09 |
| 5,658,032 | A * | 8/1997 | Gardner | 296/26.09 |
| 6,065,792 | A * | 5/2000 | Sciullo et al. | 296/26.09 |
| 6,601,895 | B1 * | 8/2003 | Tannenbaum et al. | 296/26.09 |
| 6,929,302 | B1 * | 8/2005 | Demick et al. | 296/26.09 |
| 7,083,219 | B1 * | 8/2006 | Gregory | 296/26.09 |
| 7,419,203 | B2 * | 9/2008 | Chandler et al. | 296/26.09 |
| 2007/0182185 | A1 * | 8/2007 | Nichols | 296/26.08 |

* cited by examiner

*Primary Examiner* — Lori Lyjak
(74) *Attorney, Agent, or Firm* — The Webb Law Firm

(57) ABSTRACT

A utility vehicle includes a utility body, a chamber formed in the utility body, a framework movable into and out of the chamber, and at least one utility device located on the framework.

8 Claims, 4 Drawing Sheets

UTILITY VEHICLE WITH INTEGRATED PULL-OUT FRAMEWORK

CROSS REFERENCE TO RELATED APPLICATION

This application claims the benefit of U.S. Provisional Application No. 61/076,774, filed Jun. 30, 2008, herein incorporated by reference in its entirety.

BACKGROUND OF THE INVENTION

1. Field of the Invention

This invention relates generally to utility vehicles, such as emergency vehicles and public utility vehicles.

2. Technical Considerations

Utility vehicles, such as those based on light to medium duty truck chasses, are becoming more and more popular. This increased popularity is due, at least partly, to increased vehicle affordability and versatility compared to larger, more conventional vehicles. These utility vehicles are typically outfitted for specialized functions. Examples of such functions include hauling and dumping, firefighting, salt-spreading, and rescue vehicles, just to name a few. Depending upon the particular function, the vehicle is manufactured with a particular type of body to perform that function.

In many of these utility vehicles, the center section of the vehicle (above the frame rails) may go unused due to the difficulty in accessing this area from a position at the side or rear of the vehicle. It may be difficult, if not impossible, for someone to stand along the side of the vehicle and reach to the center section due to the presence of side walls, shelving, or simply because of the distance involved. Thus, this center section of the vehicle may be underutilized. This underutilization decreases the storage capacity and overall versatility of the vehicle.

Therefore, it would be advantageous to provide a utility vehicle that reduces or eliminates this problem.

SUMMARY OF THE INVENTION

A utility vehicle of the invention comprises a utility body, a chamber formed in the utility body, a framework movable into and out of the chamber, and at least one utility device located on the framework.

A utility body of the invention comprises a chamber formed in the body, a framework movable into and out of the chamber, and at least one utility device located on the framework.

DETAILED DESCRIPTION OF THE DRAWINGS

DESCRIPTION OF THE PREFERRED EMBODIMENTS

Figure 1:
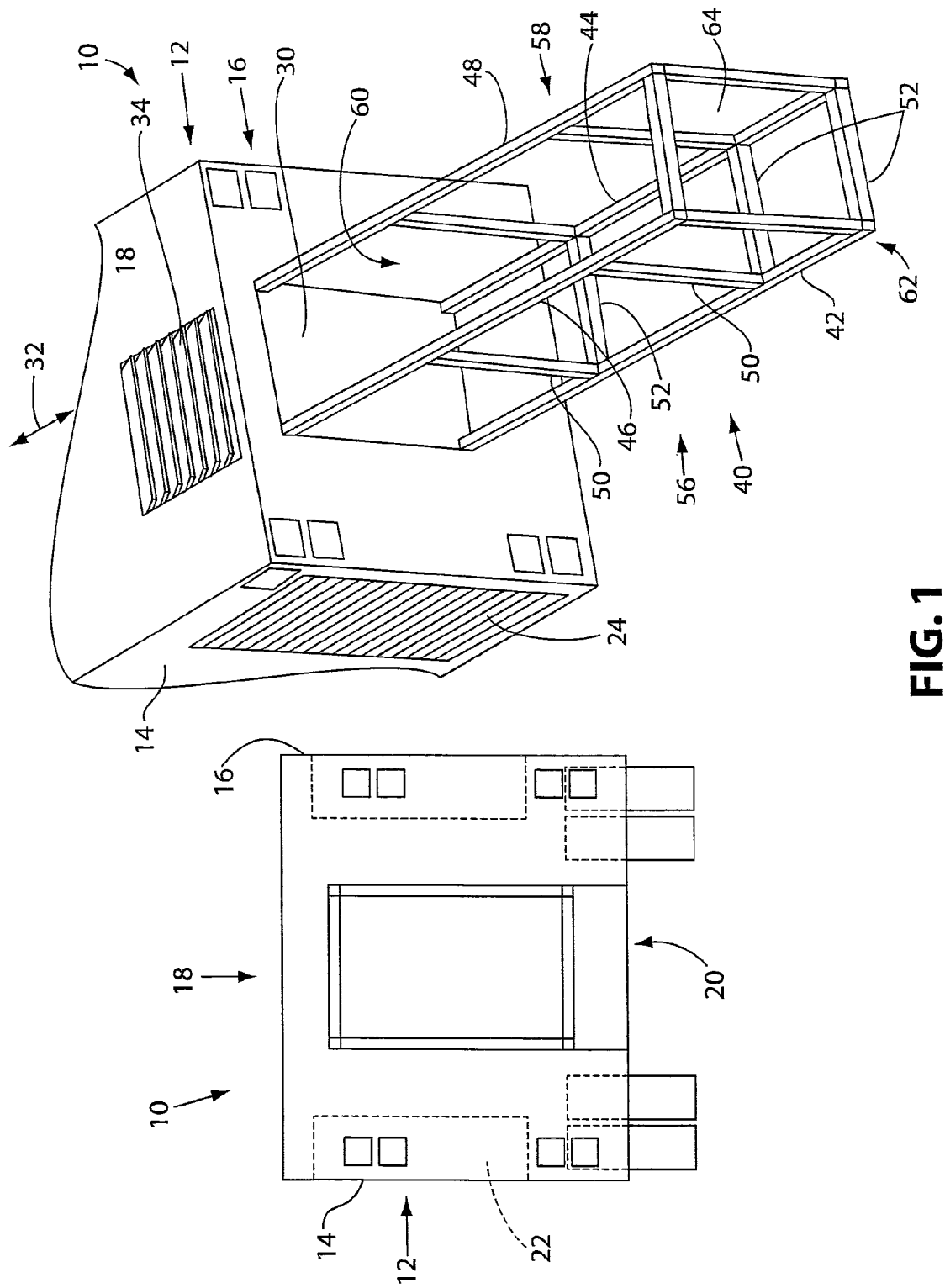
FIG. 1 is a rear and perspective view of a utility vehicle having a utility body with a movable framework of the invention.

As used herein, spatial or directional terms, such as "top", "bottom", "left", "right", "over", "under", "front", "rear", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification, figures, and claims are to be understood as being modified in all instances by the term "about". Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

As shown in FIGS. 1-4, a utility vehicle 10 of the invention has a vehicle or utility body 12 having a first (left) side 14, a second (right) side 16, a top 18, and a bottom 20. This body 12 can be carried on a conventional vehicle framework or chassis having a pair of longitudinal frame rails with a pair of spaced axles. The vehicle 10 can be powered in any conventional manner, such as by a conventional gasoline or diesel engine. The specific structure of a vehicle chassis will be well understood by anyone of ordinary skill in the art and, therefore, will not be described in detail herein. However, the utility body 12 carried by the chassis is configured to provide additional storage and utility as compared to the bodies of known utility vehicles. In the illustrated embodiment, the body 12 includes one or more conventional storage areas 22 located along one or both sides 14, 16 of the body 12. These storage areas 22 can include conventional roll-up doors 24 to provide access to the interior of the storage areas 22. The storage areas 22 can include shelves, hangers, or other features common in the art.

In the practice of the invention, the body 12 also includes a cavity or chamber 30 formed therein. In the illustrated embodiment, the chamber 30 is formed in the center of the body 12 parallel to a longitudinal axis 32 of the body 12. However, it is to be understood that this is simply one exemplary embodiment of the invention and that the chamber 30 could, if desired, be positioned at any angle, such as transverse to the longitudinal axis 32 of the body 12. One or more vents can be located in the vehicle body 12. In the illustrated embodiment, a vent 34 having movable louvers is shown on the top 18 of the body 12 to provide for air flow with the chamber 30.

A framework 40 is movable into and out of the chamber 30. In the illustrated embodiment, the framework 40 includes a pair of opposed bottom supports 42, 44 and a pair of opposed top supports 46, 48. Side supports 50 extend between the top and bottom supports. One or more cross supports 52 can be located between the bottom supports 42, 44 and/or top supports 46, 48 to provide added strength to the framework 40. The framework 40 can be made of any material, such as but not limited to metal, such as aluminum, steel, or any other metal common in the utility vehicle field. In the illustrated embodiment, the framework 40 is a substantially rectangular framework having a left side 56, a right side 58, a top 60, a bottom 62, and an outer end 64. The framework 40 can be movable into and out of the chamber 30 in any conventional manner. For example, the framework 40 can include one or more wheels configured to engage tracks located in the chamber 30 such that the framework 40 is slidable along the tracks. Alternatively, the framework 40 can be connected to a conventional drawer-type mechanism which allows the framework 40 to be pulled out of or pushed into the chamber 30. However, these are just two examples of how the framework 40 can be moved into and out of the chamber 30 and the invention is not limited to any particular type of movement device.

Figure 2:
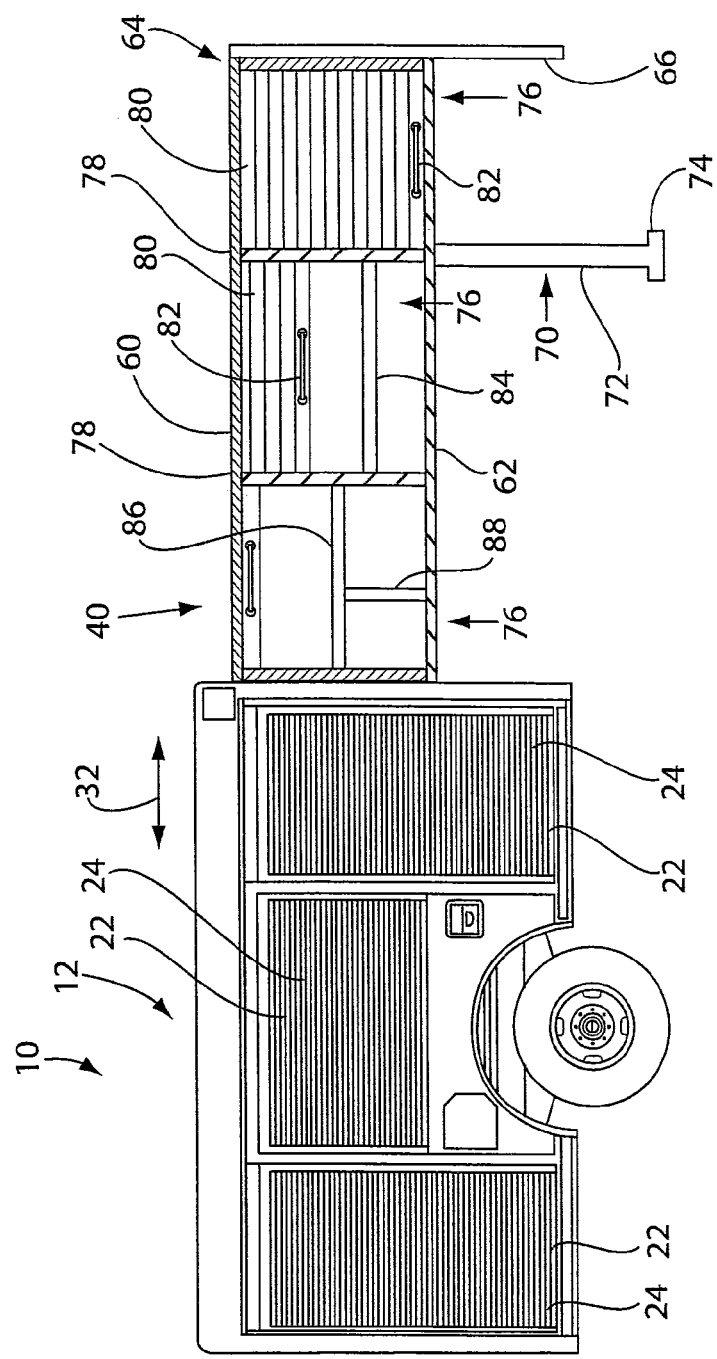
FIG. 2 is a side view of the utility body of FIG. 1 showing the framework in a fully extended position.

As shown in FIG. 2, the framework 40 can include an outer cover 66 to cover the outer end 64 of the framework 40 when the framework is inserted into the vehicle body 12. This cover 66 can include one or more control devices to control utility devices located on the framework, as described in more detail below. The framework 40 can also include a movable or retractable stand 70 connected to the bottom 62 of the framework 40 and configured to provide support for the framework 40 when the framework 40 is extended out of the body 12. For example, the stand 70 can include a leg 72 having an upper end pivotally connected to the bottom 62 of the framework 40 and a foot or pad 74 at the lower end. The stand 70 can be pivotable from a first (closed) position in which the leg 72 extends substantially parallel to the bottom 62 of the framework 40 and a lower position (shown in FIG. 2) in which the leg 72 is pivoted downwardly such that the pad 74 rests on the ground to support the outer portion of the framework 40.

In the embodiment shown in FIG. 1, the framework 40 is of an open construction. However, in the embodiment shown in FIG. 2, the framework 40 is of a closed construction and includes a plurality of sections 76 defined by spaced side walls 78. Each of the sections 76 can be closed by a door, such as a conventional sliding door 80 having a handle 82. The outermost (right most) section 76 is illustrated with the door 80 in the fully closed position. The next section (middle section) 76 shows the door 80 in a partially opened position and a shelf 84 formed in the interior of the section 76. The third (left most) section 76 shows the door 80 in the fully opened position with a shelf 86 and a vertical divider 88 dividing the section 76 into three separate storage areas. The top 60, bottom 62, and right side 58 of the framework 40 can also include covers or walls to close off the interior of the framework 40.

Figure 3:
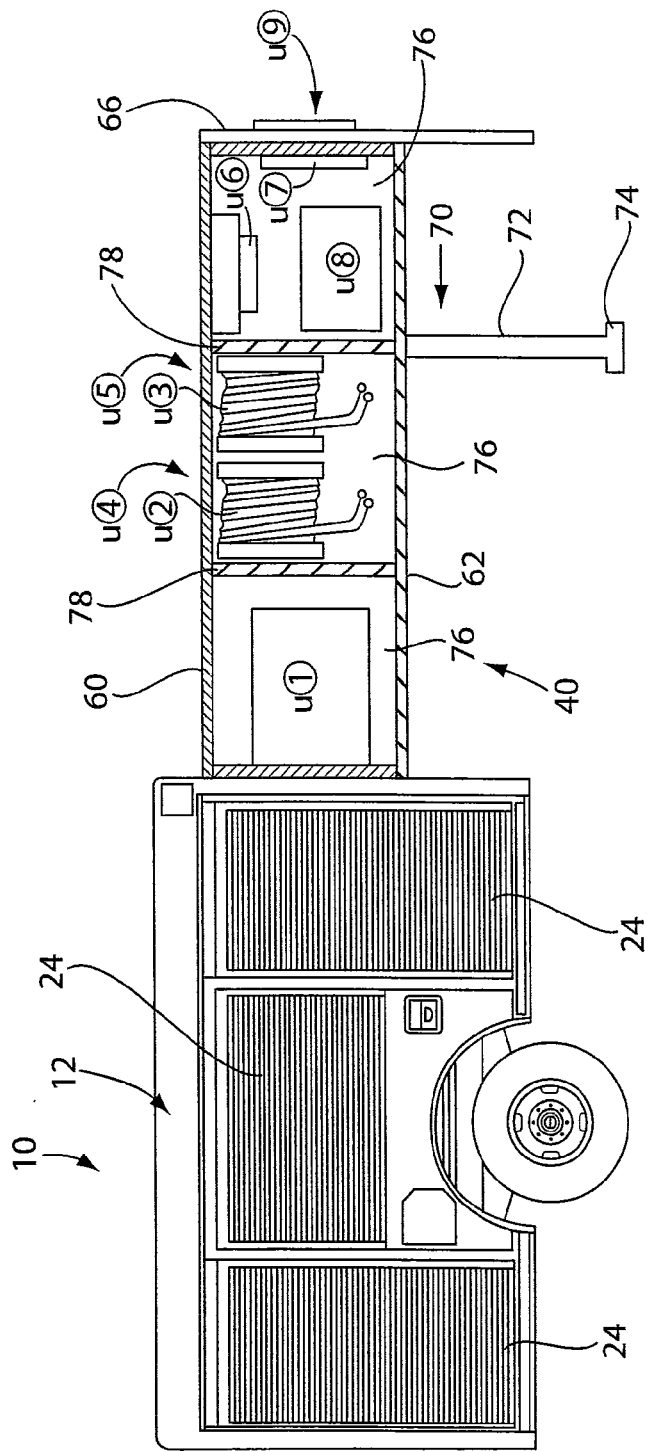
FIG. 3 is a side view of the utility body of FIG. 1 showing the presence of various utility devices on the framework.
Figure 4:
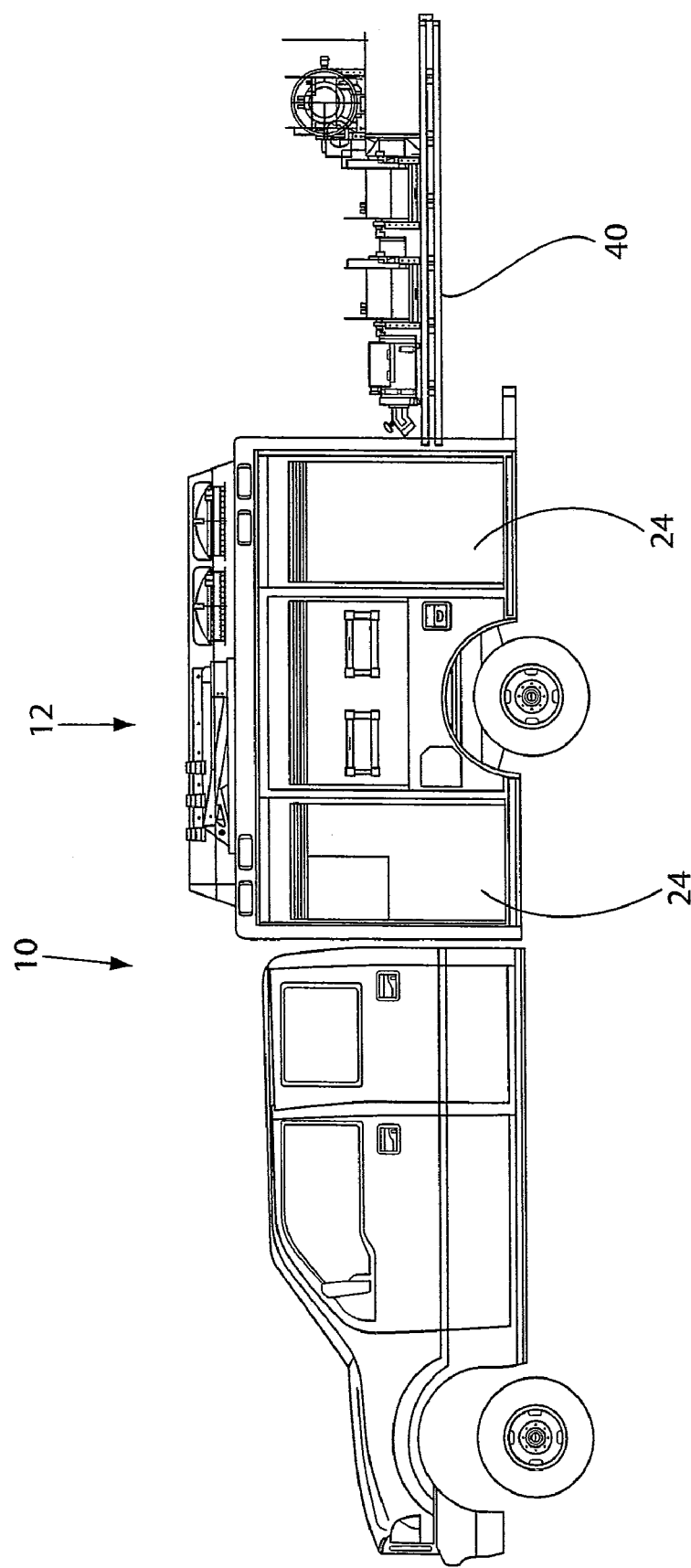
FIG. 4 is a side view of a utility vehicle having a moveable framework of the invention.

FIG. 3 shows an embodiment of the invention in which various utility devices are located in the framework 40. Exemplary utility devices include a liquid reservoir U1, hose reels U2-U5, a heat exchanger U6, EDP U7, a generator U8, and a control panel U9. Other non-limiting examples of utility devices that could be utilized in the practice of the invention include hydraulic reservoirs and filtration systems, hydraulic valves, cable reels, hydraulic drive generators, electrical controls, hoses, electrical cables, hydraulic pumps, electrical hydraulic motors, storage drawers, shelving, indicator lights, hydraulic tools, and connections therefor.

In one non-limiting embodiment, hydraulic lines, and/or electric power lines (AC and/or DC), and/or pneumatic lines can be connected to the framework 40 or connected to one or more of the utility devices located on the framework 40. These lines can be used to operate valves, pumps, motors, AC electrical outlets and the like located on or attached to the framework 40. The lines, e.g., hoses, cables, air lines, etc., can be encased in one or more hose/cable carriers so that they can roll in and out with the framework 40 without being pinched. Exemplary carriers useful for the invention are available from the Gortrac division of A & A Manufacturing Company, Inc.

For example, in one non-limiting embodiment, hydraulic hose reels carried on or attached to the framework 40 can receive hydraulic fluid from main pumps that are part of the vehicle hydraulic system mounted under the truck.

In another aspect of the invention, the utility devices may not all be individually connected to the framework 40. For example, one utility device may be connected to another, e.g., adjacent, utility device, for example, by one or more mounting brackets. Thus, at least some of the utility devices support each other.

Operation of the invention will now be described. As shown in FIG. 1, the framework 40 can be inserted into the chamber 30 in the utility body 12 such that the cover 66 seals access into the interior of the framework 40. When access to the framework 40 is desired, the framework 40 can be slidably withdrawn from the chamber 30. This can be done either manually, such as by pulling on a handle attached to the cover 66, or automatically, such as by the use of electric, pneumatic, and/or hydraulic actuators. The framework 40 can be withdrawn a selected amount from the chamber 30. That is, the entire framework 40 need not be extended from the body 12. However, after a selected length of the framework 40 is withdrawn, the stand 70 can be pivoted downwardly to provide support for the outer portion of the framework 40. In the embodiment shown in FIG. 2, when the framework 40 is in the extended position, the framework 40 doors can be opened to provide access to a selected one of the sections 76. In the embodiment shown in FIG. 3, the particular utility device desired can be accessed when the framework 40 is withdrawn from the body 12. After use, the stand 70 can be pivoted to the upright position and the framework 40 retracted, either manually or automatically, back into the interior of the body 12.

It will be readily appreciated by those skilled in the art that modifications may be made to the invention without departing from the concepts disclosed in the foregoing description. For example, the hydraulic system and/or electrical control system described in U.S. patent application Ser. Nos. 12/110,749 and 12/106,568, respectively, herein incorporated by reference in their entirety, could also be used with this invention. Accordingly, the particular embodiments described in detail herein are illustrative only and are not limiting to the scope of the invention, which is to be given the full breadth of the appended claims and any and all equivalents thereof.

The invention claimed is:

1. A rescue vehicle, comprising:
    a utility body;
    a chamber formed in the utility body;
    a framework movable into and out of the chamber; and
    at least one utility device located on the framework, wherein the utility device is selected from the group consisting of a hydraulic reservoir, a hydraulic filter, a hydraulic valve, a hose reel, a cable reel, a generator, a hydraulic drive motor, an electric or hydraulic motor, and a hydraulic tool.

2. The vehicle of claim 1, wherein the chamber has a longitudinal axis extending parallel to a longitudinal axis of the vehicle.

3. The vehicle of claim 1, wherein the chamber has a longitudinal axis extending perpendicular to a longitudinal axis of the vehicle.

4. The vehicle of claim 1, wherein the framework includes a plurality of sections.

5. The vehicle of claim 1, wherein the framework includes a movable support stand.

6. A rescue vehicle, comprising:
    a vehicle chassis;
    a utility body carried on the vehicle chassis;
    a chamber formed in the utility body and having a longitudinal axis extending parallel to a longitudinal axis of the vehicle;
    a framework movable into and out of the chamber and having an outer end;

a plurality of utility devices carried on the framework and comprising a hydraulic reservoir, at least one hydraulic valve, a hose reel, and a generator;

a cover attached to the outer end of the framework; and at least one control device located on the cover to control one or more of the utility devices.

7. The vehicle of claim 6, wherein the utility body includes at least one storage area having a roll-up door.

8. The vehicle of claim 6, wherein the utility devices further comprise at least one of a cable reel, an electrical cable, and a hydraulic tool.

* * * * *